United States Patent
Schwarzbich

(10) Patent No.: US 10,012,252 B2
(45) Date of Patent: Jul. 3, 2018

(54) ARRANGEMENT FOR CONNECTING COMPONENTS

(71) Applicant: Jörg Schwarzbich, Bielefeld (DE)

(72) Inventor: Jörg Schwarzbich, Bielefeld (DE)

( * ) Notice: Subject to any disclaimer, the term of this patent is extended or adjusted under 35 U.S.C. 154(b) by 162 days.

(21) Appl. No.: 14/912,505

(22) PCT Filed: Sep. 5, 2014

(86) PCT No.: PCT/EP2014/069005
§ 371 (c)(1),
(2) Date: Feb. 17, 2016

(87) PCT Pub. No.: WO2015/039899
PCT Pub. Date: Mar. 26, 2015

(65) Prior Publication Data
US 2016/0201703 A1    Jul. 14, 2016

(30) Foreign Application Priority Data

Sep. 18, 2013   (DE) .................... 20 2013 104 266 U

(51) Int. Cl.
*F16B 5/02*  (2006.01)
*F16B 37/12* (2006.01)

(52) U.S. Cl.
CPC .......... *F16B 5/0233* (2013.01); *F16B 5/0266* (2013.01); *F16B 37/12* (2013.01)

(58) Field of Classification Search
CPC ....... F16B 5/0233; F16B 5/025; F16B 5/0266
USPC ........................................................ 411/546
See application file for complete search history.

(56) References Cited

U.S. PATENT DOCUMENTS

| | | | | |
|---|---|---|---|---|
| 1,679,620 A | * | 8/1928 | Moore | F16B 5/0266 40/584 |
| 2,337,984 A | * | 12/1943 | Flowers | F16B 5/0233 411/190 |
| 2,563,976 A | * | 8/1951 | Torosian | F16B 5/0266 248/231.21 |
| 2,940,784 A | * | 6/1960 | Fell | F16B 5/0233 248/180.1 |
| 3,121,453 A | | 2/1964 | Modrey | |
| 3,605,508 A | * | 9/1971 | Fell | F16B 5/0233 74/89.23 |
| 4,581,871 A | | 4/1986 | Blucher et al. | |
| 7,441,980 B2 | | 10/2008 | Leitermann et al. | |

(Continued)

FOREIGN PATENT DOCUMENTS

DE        3524309 A1    1/1987
DE    102008052553 A1    4/2010

(Continued)

*Primary Examiner* — Flemming Saether
(74) *Attorney, Agent, or Firm* — Richard M. Goldberg

(57) ABSTRACT

An arrangement for connecting a first component (10) having a threaded bore (18) with a second component (12) by a screw (14) and a helical spring (20) surrounding it, which passes through the second component (12) and engages with a threaded structure (24) of this component, so that its section located between the two components forms a spacer with an adjustable axial dimension, in which the second component (12) has a pot-shaped indentation (22) which receives a section of the helical spring (20) and the bottom of which forms the threaded structure (24).

8 Claims, 6 Drawing Sheets

(56) References Cited

U.S. PATENT DOCUMENTS

| | | | |
|---|---|---|---|
| 7,588,386 B2* | 9/2009 | Kielczewski | F16B 5/0233 |
| | | | 248/188.4 |
| 9,074,614 B2* | 7/2015 | Schwarzbich | F16B 5/00 |
| 9,464,659 B2* | 10/2016 | Schwarzbich | F16B 35/04 |
| 2009/0047094 A1* | 2/2009 | Stone | F16B 5/025 |
| | | | 411/352 |

FOREIGN PATENT DOCUMENTS

| | | |
|---|---|---|
| DE | 102012110352 A1 | 5/2013 |
| EP | 0373049 A1 | 6/1990 |
| EP | 0957272 A1 | 11/1999 |

* cited by examiner

ARRANGEMENT FOR CONNECTING COMPONENTS

BACKGROUND OF THE INVENTION

The invention relates to an arrangement for connecting a first component having a threaded bore with a second component by means of a screw and a helical spring surrounding it, which passes through the second component and engages with a threaded structure of this component, so that its section located between the two components forms a spacer with an adjustable axial dimension.

By means of such arrangements, it is possible to firmly connect two components disposed at a mutual spacing by clamping them together with the spacer being sandwiched therebetween. Then, the spacer permits to compensate tolerances in the spacing between the two components.

When a suitable frictional contact exists between the screw and the helical spring, it can be accomplished that the helical spring is entrained for rotary movement when the screw is screwed-in, so that the spring changes its axial position relative to the threaded structure until the end of the spring engages the first component and thereby automatically compensates for the tolerance. When the screw is screwed further into the threaded bore of the first component, the frictional contact permits the screw to slip in the helical spring, so that the spring retains its position.

U.S. Pat. No. 7,441,980 B2 discloses an arrangement of this type in which the threaded structure at the second component is formed by an annular flange which is interrupted at one point and extends in the shape of a screw turn and engages between the turns of the helical spring. When the second component is a sheet metal, the threaded structure can directly be punched into the edge of a hole through which the screw is inserted.

When such an arrangement is assembled, it is possible to first bring the helical spring into engagement with the threaded structure and then to insert the screw, or the helical spring is seated already on the screw and is then screwed into the threaded structure while the screw is screwed into the threaded bore of the first component. In the former case, it often turns out to be difficult to insert the screw into the helical spring that projects from the sheet metal. This is particularly the case for narrow assembling sites and/or in situations in which the view onto the connection point is restricted. In the latter case, it often turns out to be difficult to arrange the helical spring and the threaded structure such that the end of the helical spring will automatically be caught in the threaded structure when the spring is screwed in. In the known arrangement, the step of the engaging the spring in the threaded structure shall be facilitated by somewhat bending the end of the wire that forms the last turn of the helical spring away from the helical spring. However, such a shape of the helical spring is difficult to establish, in particular when the helical spring is made of a hard spring steel for reasons of mechanical strength.

DE 10 2012 110 352 discloses a connecting arrangement in which the spacer is formed by a helical spring and a pot-shaped member that is in thread engagement with the helical spring. This spacer is then clamped between the two components to be connected.

SUMMARY OF THE INVENTION

It is an object of the invention to provide an arrangement of the type indicated in the opening paragraph, which is easier to assemble.

According to the invention, in order to achieve this object, the second component has a pot-shaped indentation which receives a section of the helical spring and the bottom of which forms the threaded structure.

In both variants of the assembling process as described above, the pot-shaped indentation facilitates it to align the end of the helical spring and the screw with the threaded structure. Further the indentation guides the helical spring when the latter is screwed into the threaded structure. In particular, it can be avoided in this way that the spring bends sideways or the last turn at the end of the helical spring is bent radially outwardly when it encounters resistance upon being caught in the threaded structure.

When, in the assembly process, the helical spring is seated already on the threaded shaft of the screw, the corresponding screw hole in the second component (sheet) can be found simply by moving the end of the screw over the surface of the sheet until it caves in the pot-shaped indentation. When the helical spring is first brought into engagement with the threaded structure without the screw being inserted, the same applies for aligning the helical spring with the threaded structure. As the case may be, the helical spring may then be screwed-in so far that its rear end is fully accommodated in the indentation and does no longer project beyond the surface of the sheet, so that finding the right position for the screw is also facilitated.

It is another important advantage of the invention that, in the final state, at least a part of the helical spring is received in the pot-shaped indentation, so that the helical spring and the screw project to a lesser extent (or not at all) beyond the surface of the sheet.

Useful details of the invention are indicated in the dependent claims.

In one embodiment, the threaded structure is formed in one piece with the second component.

In another embodiment, the threaded structure is formed by a separate disk-shaped member that is inserted in the pot-shaped indentation such that it forms the bottom of this indentation. Optionally, the disk can be fastened to the second component by gluing or welding.

Since, however, the disk is on the one hand supported at the part of the second component that forms the edge of the screw hole, and on the other hand can also be supported on the blocked turns of the helical spring, it is sufficient in many cases that the disk is only secured against rotation in the pot-shaped indentation. This can be achieved for example by providing a non-circular internal cross-section for the indentation and a complementary contour for the disk.

Another useful possibility is to snap-fasten the disk in a corresponding recess of the second component.

In general, using a threaded structure that is formed separately from the second component has the advantage that the thickness of the helical flange of the threaded structure can be selected independently from the sheet thickness of the second component. This facilitates or enables it to screw-in the helical spring into the threaded structure, especially in case of relatively thick sheets. The arrangement employing a separate, snap-fastened threaded structure is therefore advantageous even in cases, in which the second component has no pot-shaped indentation.

BRIEF DESCRIPTION OF THE DRAWINGS

Embodiment examples will now be described in conjunction with the drawings, wherein.

DETAILED DESCRIPTION

Figure 1:
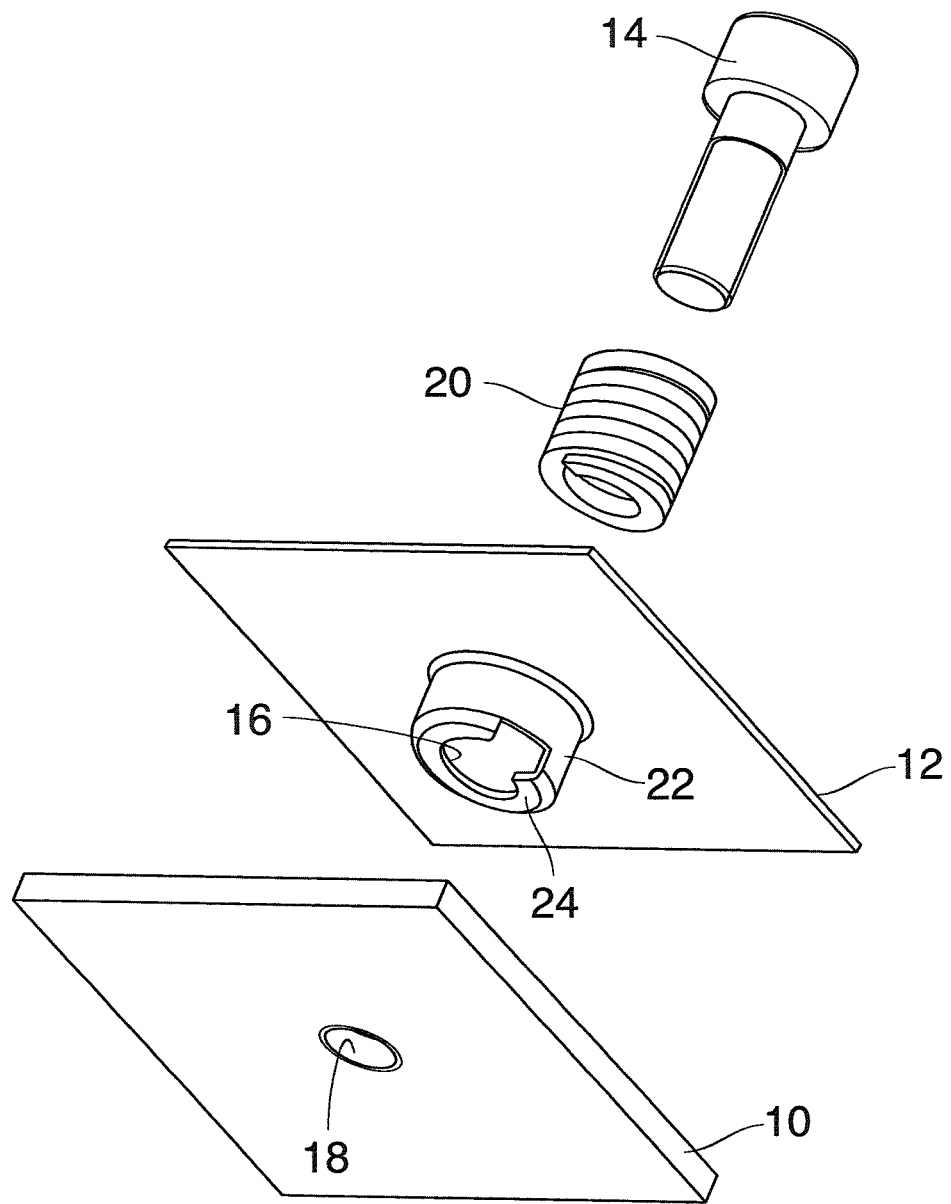
FIG. 1 is an exploded view of a connecting arrangement according to a first embodiment.

FIG. 1 shows a connecting arrangement which serves for connecting a first component 10 in a spaced-apart condition to a plate shaped second component 12, e.g. a sheet metal. To that end, a screw 14 is provided which is inserted through a screw hole 16 of the component 12 and screwed into a threaded bore 18 of the component 10. A helical spring 20 which surrounds the threaded shaft of the screw 14 serves as a spacer between the components 10 and 12. The helical spring 20 is wound for example from a spring steel wire having a rectangular cross-section.

The screw hole 16 of the second component 12 is formed at the bottom of a pot-shaped indentation 22 embossed in the sheet metal of the component 12. At the periphery of the screw holes 16, the bottom of the indentation 22 forms a threaded structure 24 shaped as a helical flange that is interrupted at one point and forms a single screw-turn. The indentation 22, the screw hole 16 and the threaded structure 24 can be punched and embossed in the sheet metal of the component 10 in one or several steps.

In the shown embodiment, the helical spring 20 is milled at both ends, or at least at the end that is facing the threaded structure 24, such that its end faces do not follow the tread pitch but extend at right angles to the axis of the helical spring. This has also the consequence that the last turn of the wire forming the helical spring is tapered in wedge shape towards its free end.

In order to establish the connection between the components 10 and 12, the helical spring 20 is inserted into the indentation 22 which surrounds the spring with little play (or possibly also without play) and thus provides some guidance. When the right-handed helical spring 20 is turned clock-wise as seen in the screw-in direction, the tapered, wedge-shaped end of the last turn is introduced into the threaded structure 24 at the point of interruption, so that the flange of the threaded structure engages between the turns of the helix. This process is facilitated due to the fact that the spring is stably guided in the indentation 22 and, further, the end of the last turn (and possibly also the end of the flange of the threaded structure) is tapered.

When the helical spring 20 is in engagement with the threaded structure 24, the screw 14 is inserted with its threaded shaft through the interior of the helical spring 20. Preferably, a certain frictional contact exists between the threaded shaft of the screw 14 and the internal surface of the spring 20. Then, consequently, when the screw 14 is screwed into the threaded bore 18, the helical spring 20 is entrained in rotary direction and is thereby screwed further through the threaded structure 24. In this way, the length of the section of the helical spring 20 between the bottom of the indentation 22 and the component 10 is increased on the cost of the section that is received in the indentation 22 and at least initially projects from this indentation.

When, finally, the end of the spring 20 abuts at the component 10, the section of the spring between the component 10 and the threaded structure 24 is compressed axially so that its turns are blocked at each other. Then, as long as the component 12 is held stationary, the helical spring can no longer be screwed further through the threaded structure 24 and can consequently not be rotated anymore, so that the screw 14 alone will continue to rotate. When, finally, the head of the screw 14 engages the other end of the spring 20, the section of the spring 20 between this head and the threaded structure 24 will also be compressed into the blocked state, so that it presses onto the threaded structure 24. In this way, the two components 10 and 12 and the helical spring 20 serving as a spacer are firmly clamped together.

When the two components 10 and 12 are already connected to one another in another position, so that they have a certain mutual spacing already ab-initio, the helical spring 20 will automatically adapt to this spacing. When, on the other hand, the component 12 is movable relative to the component 10 and is only secured against rotation, the thread engagement between the helical spring 20 and the threaded structure has the effect that the distance between the components 10 and 12 becomes larger and the plate-shaped component 12 will approach the head of the screw 14 as long as the helical spring 20 turns. The amount of this relative movement between the components 10 and 12 may be controlled by screwing the helical spring 20 to a greater or larger depth into the threaded structure 24 in a preparatory step.

On the other hand, it is also possible, that, in the initial state, the helical spring 20 is separated from the component 12 and is held frictionally on the threaded shaft of the screw 14 (and engages the head of this screw). Then, the screw 14 and the spring 20 are inserted together into the indentation 22, and the rotation establishes on the one hand the thread engagement between the threaded structure 24 and the helical spring 20 and on the other hand the thread engagement between the screw 14 and the threaded bore 18. In this situation, the threaded structure 24 having the helical, interrupted flange, permits the bottom of the indentation 22 to directly engage the component 10 in the initial state and then to move away from the component 10 in the course of the rotation of the spring 20.

The frictional contact between the screw 14 and the helical spring 20 may be established in different ways, for example by somewhat under-dimensioning the internal cross-section of the helical spring so that it will expand elastically when the threaded shaft of the screw 14 is inserted. It is also conceivable to provide, on the threaded shaft of the screw 14, a plastic sleeve which establishes the frictional contact with the helical spring. Optionally, an annular spring may be provided which is interrupted at one point of its periphery and engages the internal surface of the helical spring and is supported elastically on the outer periphery of the threaded shaft with inwardly bent spring parts, as has been shown similarly in DE 10 2012 110 352 A1.

Figure 2:
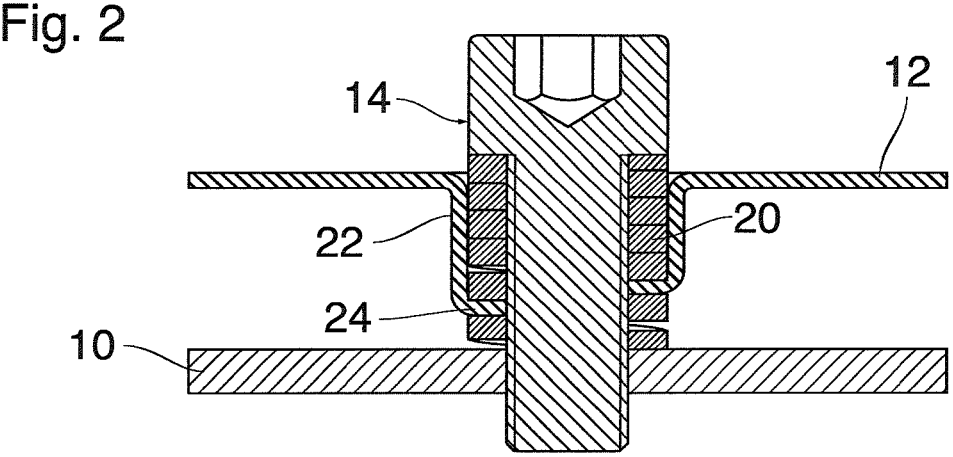
FIGS. 2 to 4 are axial sections of the connecting arrangement according to FIG. 1 in different positions.

FIG. 2 shows the connecting arrangement in a condition in which the components 10 and 12 have a relatively small spacing so that only one or two turns of the helical spring 20 are present between the component 10 and the threaded structure 24 at the bottom of the indentation 20.

In this example, the screw 14 has a cylindrical head the diameter of which coincides with the external diameter of the helical spring 20 and the internal diameter of the indentation 22 which is also cylindrical. When a larger spacing shall be established between the components 10 and 12, as has been shown in FIGS. 3 and 4, the head of the screw 14 may therefore also plunge into the indentation 22. FIG. 4 shows a condition in which the head of the screw is almost completely accommodated in the indentation 22. Since an internal hexagon 28 is provided as a grip in the head of the screw 14, the screw could be tightened even when its head were completely received in the indentation 22 and would therefore no longer project beyond the surface of the component 12.

Figure 3:
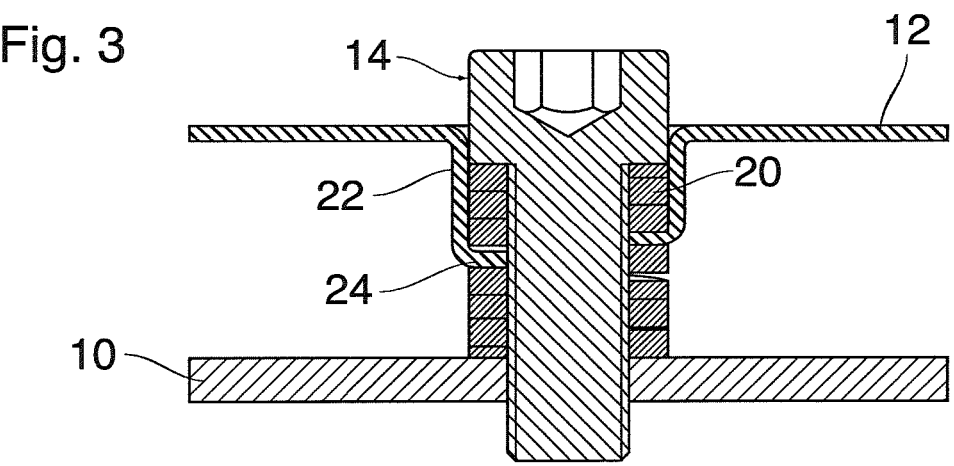
Figure 4:
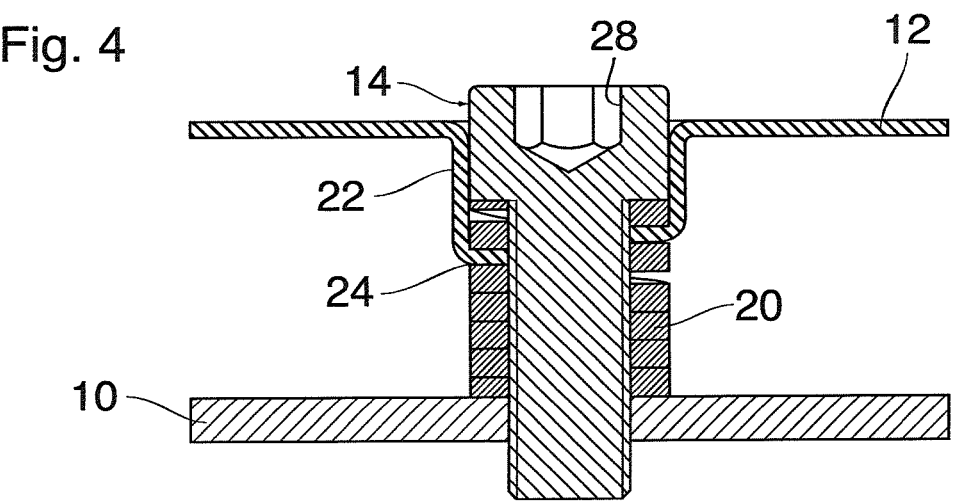

The different configurations that have been shown in FIGS. 2 to 4 may be established for example by initially inserting the screw 14 only so far into the helical spring 20 that it does not yet engage the threaded bore of the component 10. When, then, the screw is rotated together with the spring 20 while the component 12 is prevented from co-rotation, the threaded structure 24 will be screwed through the helical spring, and the distance between the components 10 and 12 will increase. Subsequently, the screw 14 is thrust-in deeper until it is caught in the threaded bore of the component 10. In the further course of the screw-in movement, until the screw 14 is firmly tightened, the screw makes a fixed number of turns until the head of the screw is supported on the helical spring which is compressed into the blocked state. Since the helical spring 20 makes the same number of turns, the axial spacing between the components 10 and 12 is changed in this operation by an amount that is known in advance.

The helical spring 20 may be wound such that its turns are already in the blocked state when the spring is not strained. Optionally, it may also be wound such that its turns have a certain mutual spacing in the non-strained condition, which will further facilitate the insertion of the helical spring into the threaded structure 24. The turns of the spring will then reach the blocked state only in the further course of the screw-in movement, when the turns are compressed to one part between the component 10 and the threaded structure 24 and to the other part between the threaded structure 24 and the head of the screw 14.

Figure 5:
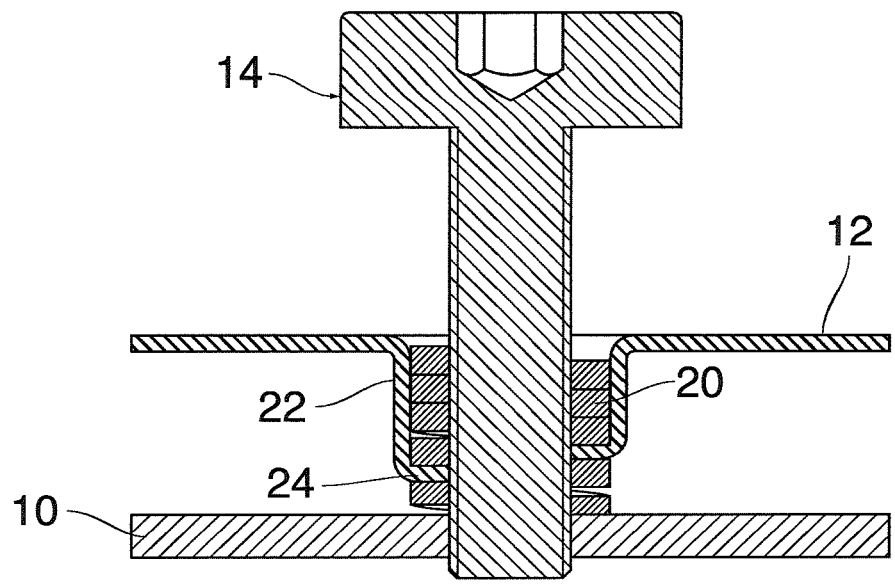
FIGS. 5 and 6 are axial sections of a connecting arrangement according to another embodiment.
Figure 6:
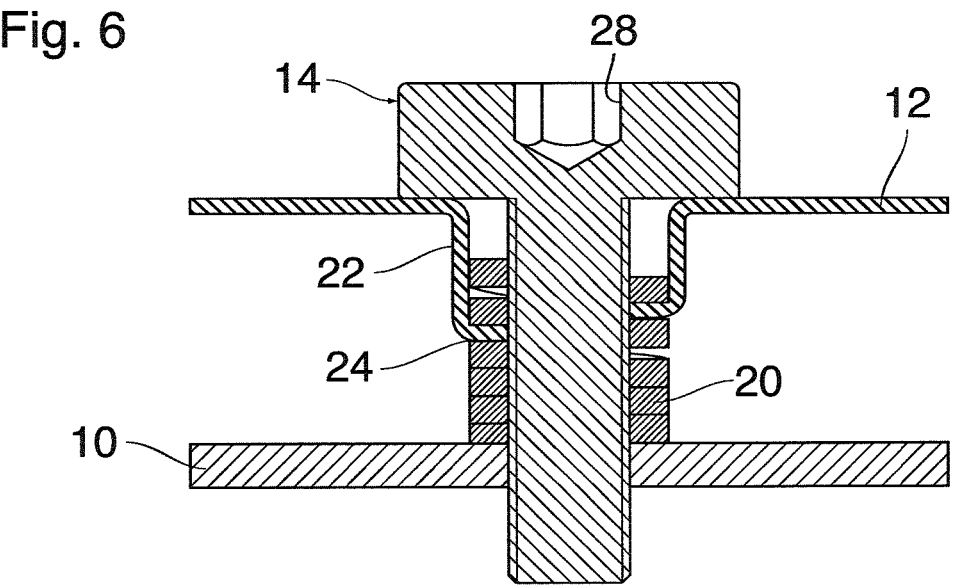

In another embodiment, it is also possible that the head of the screw 14 has a larger diameter than the indentation 22 An example has been shown in FIGS. 5 and 6. In this case, the head of the screw cannot plunge into the indentation but will be supported at the top surface of the component 12 when the screw is tightened. Dependent upon the spacing between the components 10 and 12, the top end of the helical spring 20 will then have a smaller or larger distance from the head of the screw in the final state. The lower section of the helical spring which servers as the spacer will in any case be subject to compressive forces between the threaded structure 24 and the component 10. It is an advantage of this solution that the helical spring needs not to be milled level at the top end.

The last-described embodiment has also the advantage that the amount of projection of the head of the screw 14 beyond the surface of the component 10 is always the same, independent from the distance between the components.

In the state at delivery, the helical spring 20 may already be thrust onto the threaded shaft of the screw 14. Also, optionally, the spring may already be in engagement with the threaded structure 24 in this state, and it may assume a certain axial position which determines the spacing between the components that will finally be reached when the connection has been established. Eventually, it is also possible that, in the state at delivery, the helical spring is already in engagement with the threaded structure 24 and the screw is inserted already and is held by frictional contact, so that, in order to establish the connection, it is only required to align the screw 14 with the threaded bore 18 in the component 10 and to tighten the screw.

Figure 7:
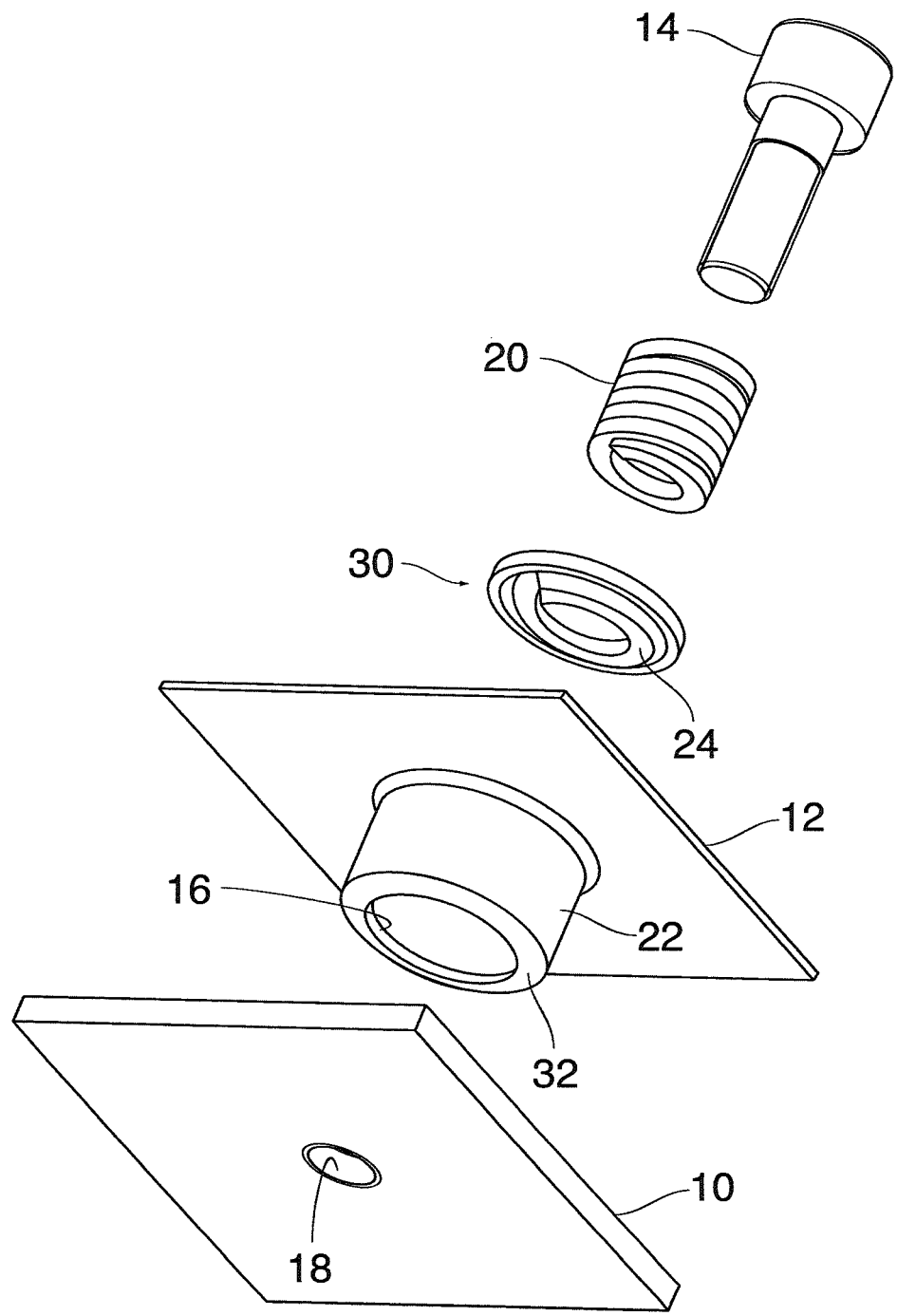
FIG. 7 is an exploded view of a connecting arrangement according to yet another embodiment.

FIG. 7 shows a connecting arrangement according to a modified embodiment which differs from the embodiment examples described before in that the threaded structure 24 is not formed in one piece in the bottom of the indentation 22 of the component 12 but is rather formed by a separate disk 30 which may be formed for example by punching and embossing and may than be laid into the indentation 22. In this case, the indentation 22 has at its bottom an inwardly crimped edge 32 on which the disk 30 is supported.

Figure 8:
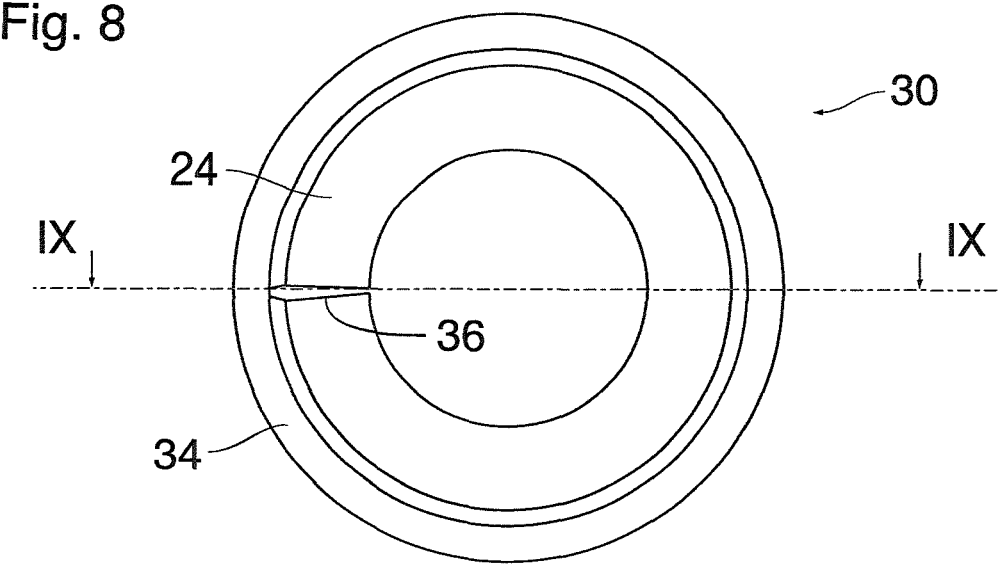
FIG. 8 is a plan-view of a disk that forms a threaded structure.
Figure 9:
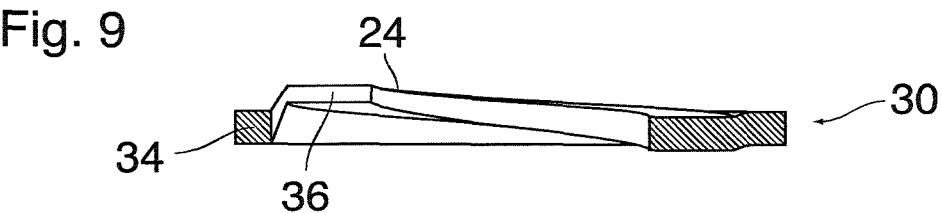
FIG. 9 is a section taken along the line IX-IX in FIG. 8.

The disk 30 has been shown in a plan view in FIG. 8 and in cross-section in FIG. 9. It has, at its outer periphery, a flat ring 34 with constant thickness to which adjoins on the inner side the helical flange forming the threaded structure 24. The height of the threaded structure 24 decreases continuously in circumferential direction (counter clock-wise in FIG. 8) and then increases abruptly back to the original value at the point of an interruption 36.

Figure 10:
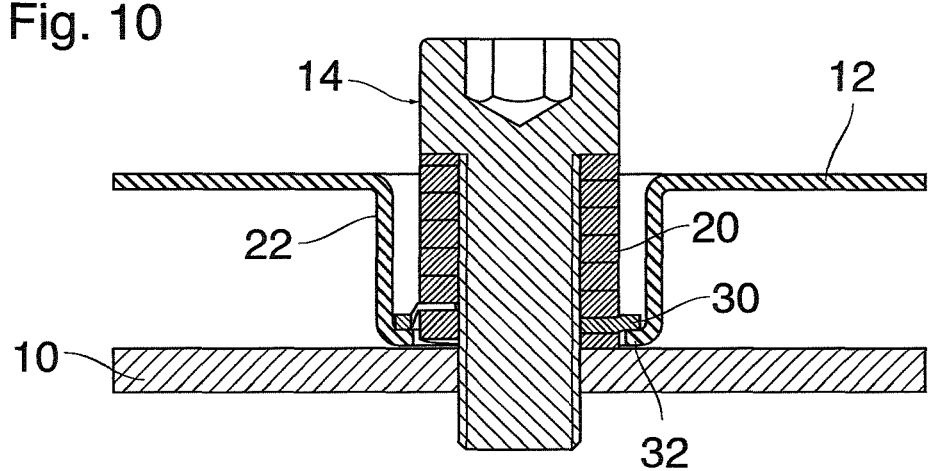
FIG. 10 is an axial section of the connecting arrangement according to FIG. 7.

FIG. 10 shows how the disk 30 rests with its ring 34 on the edge 32 at the bottom of the indentation 22. In this example, the peripheral wall of the indentation 22 surrounds the helical spring 20 with a somewhat larger radial play. The disk 30 may be firmly connected to the indentation 22, for example by welding or gluing. However, since the component 10 extends underneath the disk 30 with the edge 32 of the indentation, and the disk is supported at the lower end of the spring 20 while the top end of the spring engages the head of the screw 14, as shown in FIG. 10, the components 10 and 12 would be firmly held together and clamped even when the disk 30 had only been loosely placed in the indentation. The disk 30 should however be secured against rotation relative to the indentation 22. This can be achieved for example by pressing the disk with some tension into the indentation 22.

Figure 11:
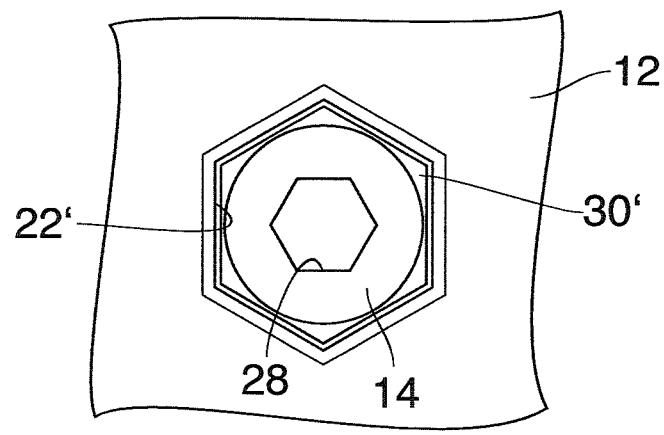
FIG. 11 shows a connecting arrangement according to another embodiment in a plan view.

FIG. 11 shows an alternative embodiment in which the component 12 has an indentation 22' with a non-circular, e.g. polygonal internal cross-section, and the threaded structure is formed at a disk 30' that has been loosely placed in the indentation and has an outer contour complementary to that of the indentation 22'. In FIG. 11, the helical spring is hidden behind the cylindrical head of the screw 14 and has the same diameter as the head of the screw. In this example, the outer contour of the disk 30' is a hexagon the sides of which extend tangentially relative to the outer periphery of the spring, so that they guide the spring. The disk is supported on the bottom of the indentation 22 only in the corners of the hexagon.

Optionally, the screw 14, the helical spring 20 and the disk 30 and 30', respectively, may be delivered as a pre-mounted unit so that costs can be saved in the final assembly.

Figure 12:
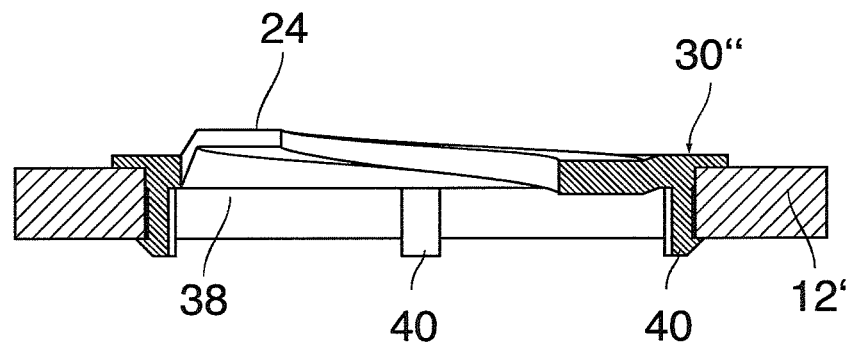
FIG. 12 is an axial section of parts of a connecting arrangement according to another embodiment.

FIG. 12 shows an example in which the threaded structure 24 is formed at a disk 30" which is snap-fastened in a recess 38 of a plate-shaped component 12' which, in this case, does not have an indentation. The disk 30" may be formed of plastics, for example, and may have snap claws 40 that straddle the edge of the recess 38.

When a higher strength is required, the disk 30" may also be formed of metal and may optionally have a plastic socket with which it is snap-fastened in the recess 38.

In the example shown in FIG. 12, the component 12' has a relatively large thickness. Due to the separate construction of the component 12' and the disk 30", the flange forming the threaded structure 24 may have a substantially smaller thickness so that the process of screwing-in the helical spring is not compromised.

The invention claimed is:

1. An arrangement for connecting a first component having a threaded bore with a second component, comprising:
   a screw,
   a helical spring surrounding the screw,
   a threaded structure of the second component, with the screw passing through the second component and engaging with the threaded structure of the second component, so that a section of the spring located between the first and second components forms a spacer with an adjustable axial dimension, and
   wherein the second component has a pot-shaped indentation which receives a section of the helical spring and a bottom of the pot-shaped indentation forms the threaded structure.

2. The arrangement according to claim 1, wherein the threaded structure is formed in one piece with the indentation.

3. The arrangement according to claim 1, wherein the screw has a head having a largest outer diameter which is smaller than a smallest internal diameter of the indentation.

4. The arrangement according to claim 1, wherein the helical spring is supported at internal surfaces of the indentation.

5. The arrangement according to claim 1, wherein the threaded structure is formed at a disk which is formed separately from the second component.

6. The arrangement according to claim 5, wherein the indentation has a non-circular internal cross-section and the disk has a non-circular contour.

7. The arrangement according to claim 5, wherein the disk rests with an outer peripheral edge thereof on an inwardly projecting edge of the indentation.

8. The arrangement according to claim 1, wherein the screw has a head and rests with its head on a part of the second component outside of the indentation, when a connection has been established.

\* \* \* \* \*